United States Patent
Hobbs

(10) Patent No.: US 10,015,453 B2
(45) Date of Patent: Jul. 3, 2018

(54) TUNNEL CAMERA SYSTEM

(71) Applicant: Michael T. Hobbs, San Jose, CA (US)

(72) Inventor: Michael T. Hobbs, San Jose, CA (US)

( * ) Notice: Subject to any disclaimer, the term of this patent is extended or adjusted under 35 U.S.C. 154(b) by 277 days.

(21) Appl. No.: 14/817,017

(22) Filed: Aug. 3, 2015

(65) Prior Publication Data

US 2017/0041573 A1  Feb. 9, 2017

(51) Int. Cl.
| | |
|---|---|
| *H04N 5/225* | (2006.01) |
| *H04N 5/33* | (2006.01) |
| *H04N 7/18* | (2006.01) |
| *A01K 29/00* | (2006.01) |
| *A01M 23/00* | (2006.01) |
| *A01K 3/00* | (2006.01) |

(52) U.S. Cl.
CPC ........... *H04N 7/188* (2013.01); *A01K 29/005* (2013.01); *H04N 5/2251* (2013.01); *H04N 5/33* (2013.01); *A01K 2003/007* (2013.01)

(58) Field of Classification Search
CPC ........ H04N 5/2253; H04N 5/33; H04N 7/188; H04N 5/2256; A01K 29/005; A01M 23/00
USPC .......................................................... 348/82
See application file for complete search history.

(56) References Cited

U.S. PATENT DOCUMENTS

| | | | | |
|---|---|---|---|---|
| 4,949,074 A * | 8/1990 | D'Ambrosia | ......... | G01S 17/026 340/541 |
| 5,045,702 A * | 9/1991 | Mulleer | .................... | G01J 5/34 250/338.3 |
| 5,164,707 A * | 11/1992 | Rasmussen | ............ | G08B 21/18 250/221 |
| 5,185,953 A * | 2/1993 | Gross | .................... | A01M 23/12 43/58 |
| 5,460,123 A * | 10/1995 | Kolz | ..................... | A01M 29/24 119/220 |
| 6,088,948 A * | 7/2000 | Rønnau | .................. | A01M 23/02 43/64 |
| 7,278,375 B2 * | 10/2007 | Ross | ....................... | A01K 15/02 116/22 A |

(Continued)

FOREIGN PATENT DOCUMENTS

JP        11306313       *   1/1998  .............. G06M 7/00

*Primary Examiner* — Deirdre Beasley
(74) *Attorney, Agent, or Firm* — Douglas L. Weller

(57) ABSTRACT

An animal detection unit detects cold-blooded animals and small mammals traversing a tunnel or other constricted area. The animal detection unit includes an elevated threshold that extends across a width of the tunnel or other constricted area. A photo emitter generates a light beam. The photo emitter is located at a first end of the elevated threshold. A photoelectric receiver receives the light beam. The photoelectric receiver is located at a second end of the elevated threshold. The light beam is low enough with respect to the elevated threshold that cold-blooded animals and small mammals moving over the elevated threshold are raised in height sufficiently to block the light beam as the cold-blooded animals and small mammals move over the elevated threshold. A camera is mounted on the frame. The camera is aimed and focused to capture visual recordings of the cold-blooded animals and small mammals as they move over the elevated threshold. The photoelectric receiver sends a trigger signal when an animal blocks the light beam. The camera captures a first visual recording of the animal when the photoelectric receiver sends the trigger signal.

18 Claims, 10 Drawing Sheets

(56) References Cited

U.S. PATENT DOCUMENTS

| | | | | |
|---|---|---|---|---|
| 9,204,501 B1* | 12/2015 | Cashman | | H05B 6/666 |
| 9,426,357 B1* | 8/2016 | Campbell | | H04N 5/907 |
| 2002/0159770 A1* | 10/2002 | Moultrie, Jr. | | G03B 17/00 |
| | | | | 396/265 |
| 2004/0155783 A1* | 8/2004 | Al-Sheikh | | G08B 21/22 |
| | | | | 340/584 |
| 2005/0240317 A1* | 10/2005 | Kienzle-Lietl | | G01G 9/00 |
| | | | | 700/303 |
| 2006/0048720 A1* | 3/2006 | Kajihara | | A01K 29/00 |
| | | | | 119/712 |
| 2007/0019941 A1* | 1/2007 | Cross | | F16M 11/10 |
| | | | | 396/263 |
| 2007/0273766 A1* | 11/2007 | Wilson | | G01S 3/7864 |
| | | | | 348/169 |
| 2008/0001735 A1* | 1/2008 | Tran | | G06F 19/3418 |
| | | | | 340/539.22 |
| 2008/0019563 A1* | 1/2008 | Goodwin | | B07C 1/18 |
| | | | | 382/101 |
| 2009/0020073 A1* | 1/2009 | Hansen | | A01K 5/0291 |
| | | | | 119/51.11 |
| 2009/0272409 A1* | 11/2009 | Petit | | B60S 3/04 |
| | | | | 134/32 |
| 2011/0279683 A1* | 11/2011 | Yarmchuk | | H04N 5/232 |
| | | | | 348/169 |
| 2012/0301129 A1* | 11/2012 | Smith | | G03B 17/561 |
| | | | | 396/427 |
| 2012/0306384 A1* | 12/2012 | Chen | | H05B 33/0854 |
| | | | | 315/159 |
| 2012/0307127 A1* | 12/2012 | Qian | | G02B 7/005 |
| | | | | 348/335 |
| 2013/0010109 A1* | 1/2013 | Chen | | H04N 5/2251 |
| | | | | 348/143 |
| 2013/0205666 A1* | 8/2013 | Fortin | | E06B 11/022 |
| | | | | 49/13 |
| 2013/0211864 A1* | 8/2013 | Sanderson | | G06Q 10/02 |
| | | | | 705/5 |
| 2014/0020635 A1* | 1/2014 | Sayers | | A01K 15/021 |
| | | | | 119/721 |
| 2014/0168430 A1* | 6/2014 | Unger | | H04N 7/183 |
| | | | | 348/143 |
| 2014/0264035 A1* | 9/2014 | Kleihorst | | G01J 5/025 |
| | | | | 250/342 |
| 2016/0227738 A1* | 8/2016 | Ausman | | A01K 5/0233 |
| 2016/0248972 A1* | 8/2016 | Garrison | | H04N 5/23238 |
| 2016/0252646 A1* | 9/2016 | Sarraiocco | | G01V 5/0016 |
| | | | | 382/103 |
| 2016/0277688 A1* | 9/2016 | Gaskamp | | H04N 5/332 |
| 2016/0337560 A1* | 11/2016 | Wynalda, Jr. | | H04N 5/2252 |
| 2016/0370411 A1* | 12/2016 | Bruwer | | G01D 5/24 |

* cited by examiner

TUNNEL CAMERA SYSTEM

BACKGROUND

Wildlife crossings allow animals to safely cross roads and other human-made barriers. Wildlife crossings can be underpass tunnels, over passes, viaducts, fish ladders and smaller tunnels for reptiles, amphibians and small mammals.

Wildlife crossings are a useful practice to conserve habitats and combat habitat fragmentation. They are also useful in avoiding death or injury to wildlife.

DETAILED DESCRIPTION

A tunnel camera system includes a frame sized to fit within a tunnel. An animal detection unit detects cold-blooded animals and small mammals traversing the tunnel. The animal detection unit includes an elevated threshold that extends across a width of the tunnel. A photo emitter generates a light beam. The photo emitter is located at a first end of the elevated threshold. A photoelectric receiver receives the light beam. The photoelectric receiver is located at a second end of the elevated threshold. The light beam is low enough with respect to the elevated threshold that cold-blooded animals and small mammals moving over the elevated threshold are raised in height sufficiently to block the light beam as the cold-blooded animals and small mammals move over the elevated threshold. A camera is mounted on the frame. The camera is aimed and focused to capture visual recordings of the cold-blooded animals and small mammals as they move over the elevated threshold. The photoelectric receiver sends a trigger signal when an animal blocks the light beam. The camera captures a first visual recording of the animal when the photoelectric receiver sends the trigger signal.

For example, each visual recording is a picture or a video. For example, the camera includes a passive infrared (PIR) motion sensor that detects when medium sized warm-blooded animals traverse the tunnel. The camera captures visual recordings of the medium sized warm-blooded animals when the PIR motion sensor detects the medium sized warm-blooded animals traversing the tunnel.

For example, the tunnel camera additionally includes a controller that receives the trigger signal from the photoelectric receiver. The controller generates a capture signal on the PIR motion sensor when the controller receives the trigger signal from the photoelectric receiver. For example, the controller includes a relay connected to a drain pin of a pyroelectric field effect transistor (FET) within the PIR motion sensor and connected through a resistor to a source pin of the pyroelectric FET. The relay completes a circuit from the drain pin through the resistor to the source pin when the controller receives the trigger signal from the photoelectric receiver.

While in the description below, the camera system is described as embodied specifically for a tunnel, the camera system can be used for any constricted area where an elevated threshold can be placed across the constricted area and video recordings are made of cold-blooded animals and small mammals traversing the constricted area by passing over the elevated threshold.

Figure 1:
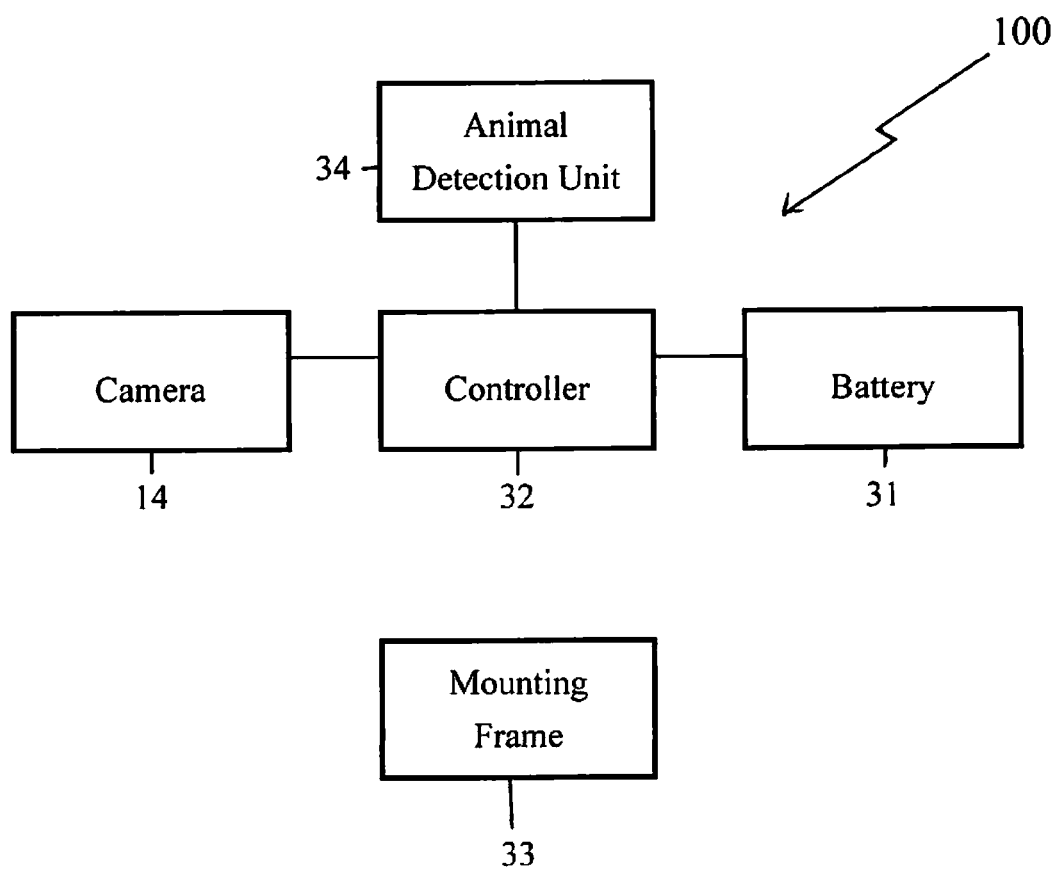
FIG. 1 is a block diagram of a tunnel camera system in accordance with an embodiment.

FIG. 1 is a block diagram of a tunnel camera system 100. Tunnel camera system 100 is inserted into a tunnel at its entrance. Tunnel camera system 100 can be slid back into the tunnel, out of view of humans passing by the tunnel. Tunnel camera system 100 takes pictures and/or videos of all small and medium sized animals (cold-blooded and medium sized warm-blooded) that access the tunnel. The pictures or video can be used, for example, when collecting qualitative and quantitative data for scientific studies.

Tunnel camera system 100 consists of four sub-assemblies mounted on a frame 33. The four sub-assemblies are a camera 14, an animal detection unit 34, a battery 31 and a controller 32. While in FIG. 1, controller 32 is shown separate from camera 14, controller 32 may be integrated into camera 14.

Figure 2:
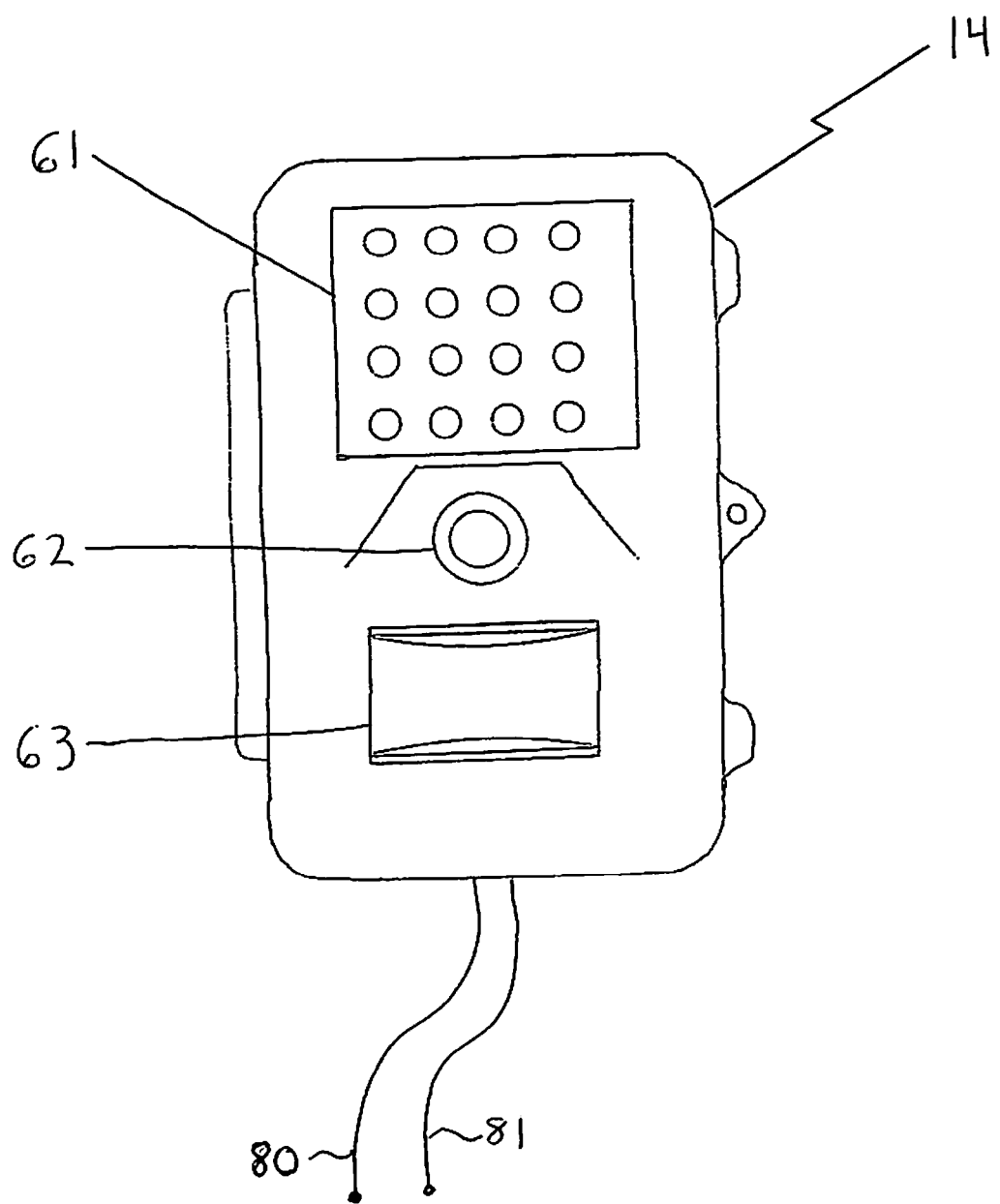
FIG. 2 shows a game/trail camera in accordance with the prior art.

Camera 14 is shown in FIG. 2. For example, camera 14 is either a game camera or a trail camera that includes a camera lens 62, a passive infrared (PIR) motion sensor 63 and an infrared (IR) flash 61. For example, passive infrared (PIR) motion sensor 63 utilizes a pyroelectric device that senses heat and motion.

When activated by heat and motion, passive infrared (PIR) motion sensor 63 generates signals that are used to initiate capturing a visual recording. The visual recording is, for example, a photograph or a video, depending upon camera configuration. Infrared flash 61 is utilized in dark environments, for example, using infrared (IR) light emitting diodes (LEDs). The infrared flash projects infrared illumination in a light spectrum that is not detectable by animals being illuminated for the purpose of recording their presence in dark environments.

Figure 3:
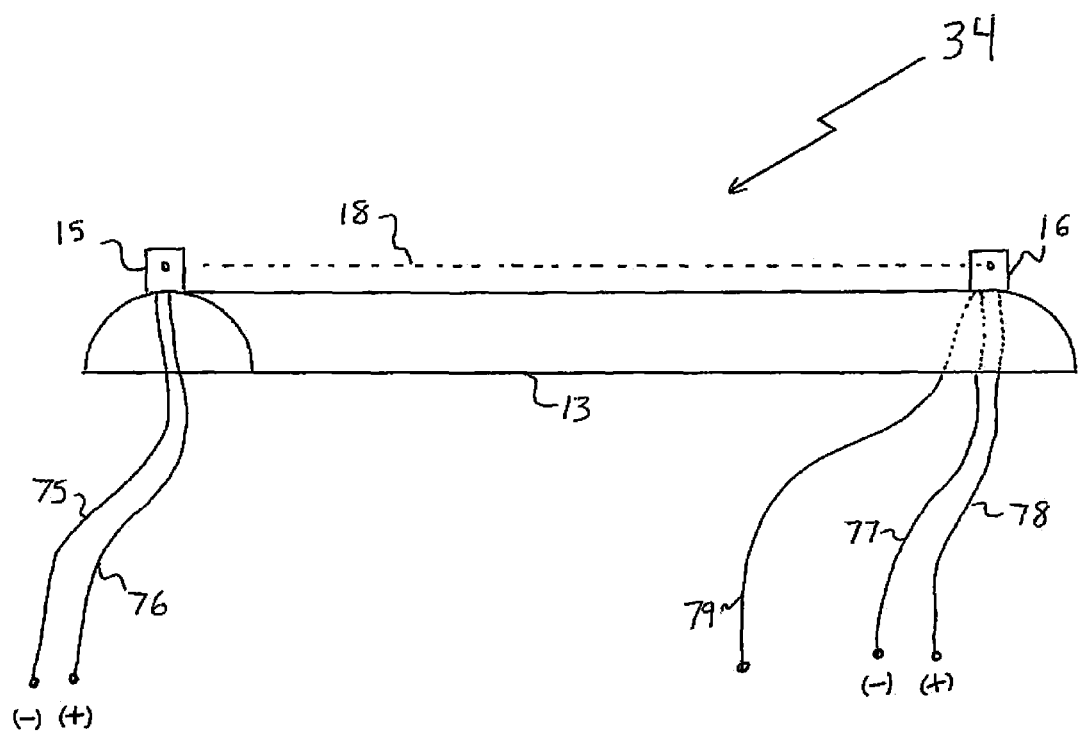
FIG. 3, FIG. 4 and FIG. 5 illustrate use of an animal detection unity within a tunnel camera system in accordance with an embodiment.
Figure 4:
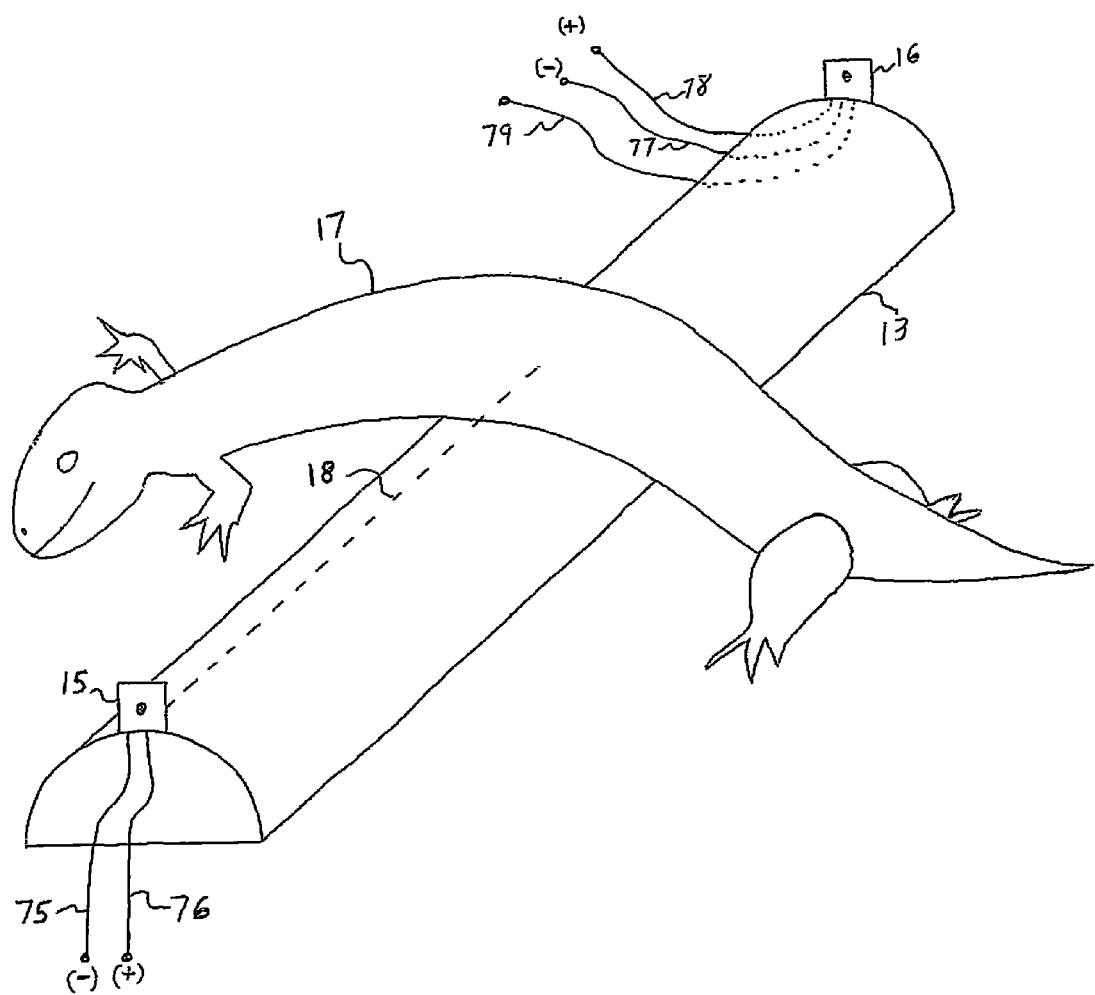
Figure 5:
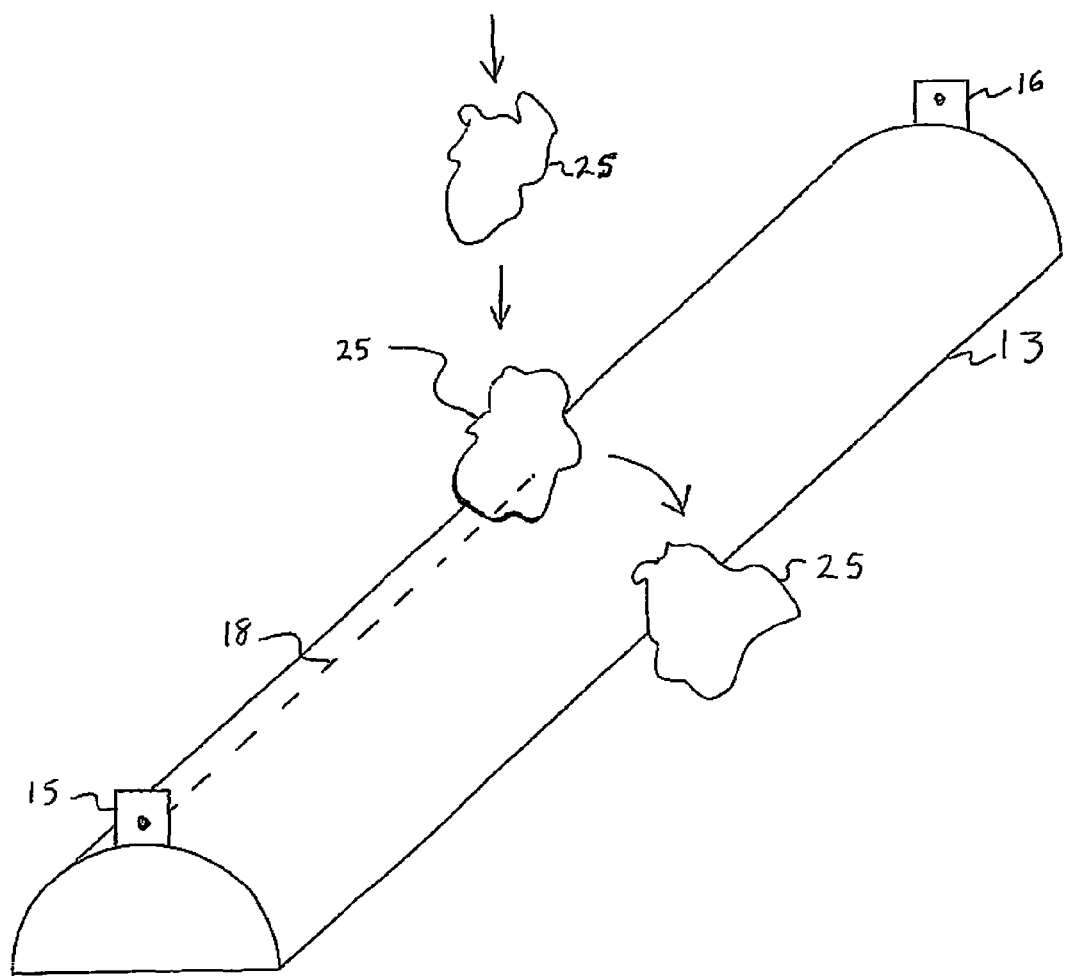

FIG. 3, FIG. 4 and FIG. 5 provided details of animal detection unit 34. As shown in FIG. 3, a photo emitter 15 produces a light beam 18 in the direction of a photoelectric receiver 16. For example, the light beam is a narrow LED light beam. Photo emitter 15 and photoelectric receiver 16 are mounted on opposite ends of an elevated threshold 13. Elevated threshold 13 lies on the ground within a tunnel, perpendicular to the length of the tunnel. As illustrated in FIG. 4, when an animal 17, such as an amphibian, reptile or small mammal, crosses elevated threshold 13, animal 17 temporarily blocks light beam 18 from reaching photoelectric receiver 16. This allows production of a trigger signal forwarded to controller 32. Upon receipt of the trigger signal, controller 32 signals camera 14 to capture a visual recording (such as a picture and/or a video) of animal 17, whether in daylight or darkness.

The use of elevated threshold 13 is particularly important when capturing cold-blooded animals and small mammals traversing through the tunnel. By cold-blooded animals are meant amphibians (e.g., salamanders and frogs), reptiles (e.g., snakes and lizards) and large invertebrates (e.g., scorpions and tarantulas). By small mammals are meant mammals under 680 grams (1.5 lbs.), such as mice, rats, moles, voles, and squirrels.

A passive infrared (PIR) motion sensor will detect medium and large sized warm-blooded animals based on heat and motion sensing. By medium size mammals are meant mammals from 680 grams to 3629 grams (1.5 to 8 lbs.), such as raccoons, opossums and skunks. However, a PIR motion sensor cannot consistently or reliably detect cold-blooded animals and small mammals traversing through the tunnel. Animal detection unit 34 facilitates detection of cold-blooded animals and small mammals. Typically cold-blooded animals such as salamanders, frogs, snakes, lizards, and large invertebrates of various species are fairly small. For this reason, the height of light beam 18 is adjusted so that these types of amphibians, small reptiles and large invertebrates will break beam 18 when traversing over elevated threshold 13. If desired, several light beams can be used to detect animals of various sizes.

Elevated threshold 13 is shaped so that amphibians, reptiles, large invertebrates and small mammals can easily traverse it. Elevated threshold 13 is also shaped so that it discourages debris build up on top of elevated threshold 13. For example, as shown in FIG. 5, elevated threshold 13 is shaped essentially as a half cylinder so that debris, represented in FIG. 5 by debris 25, will roll off of elevated threshold 13. This will prevent, or at least hinder, debris build-up from blocking light beam 18. For example, elevated threshold 13 is made of plastic, wood, metal or some other material.

Figure 6:
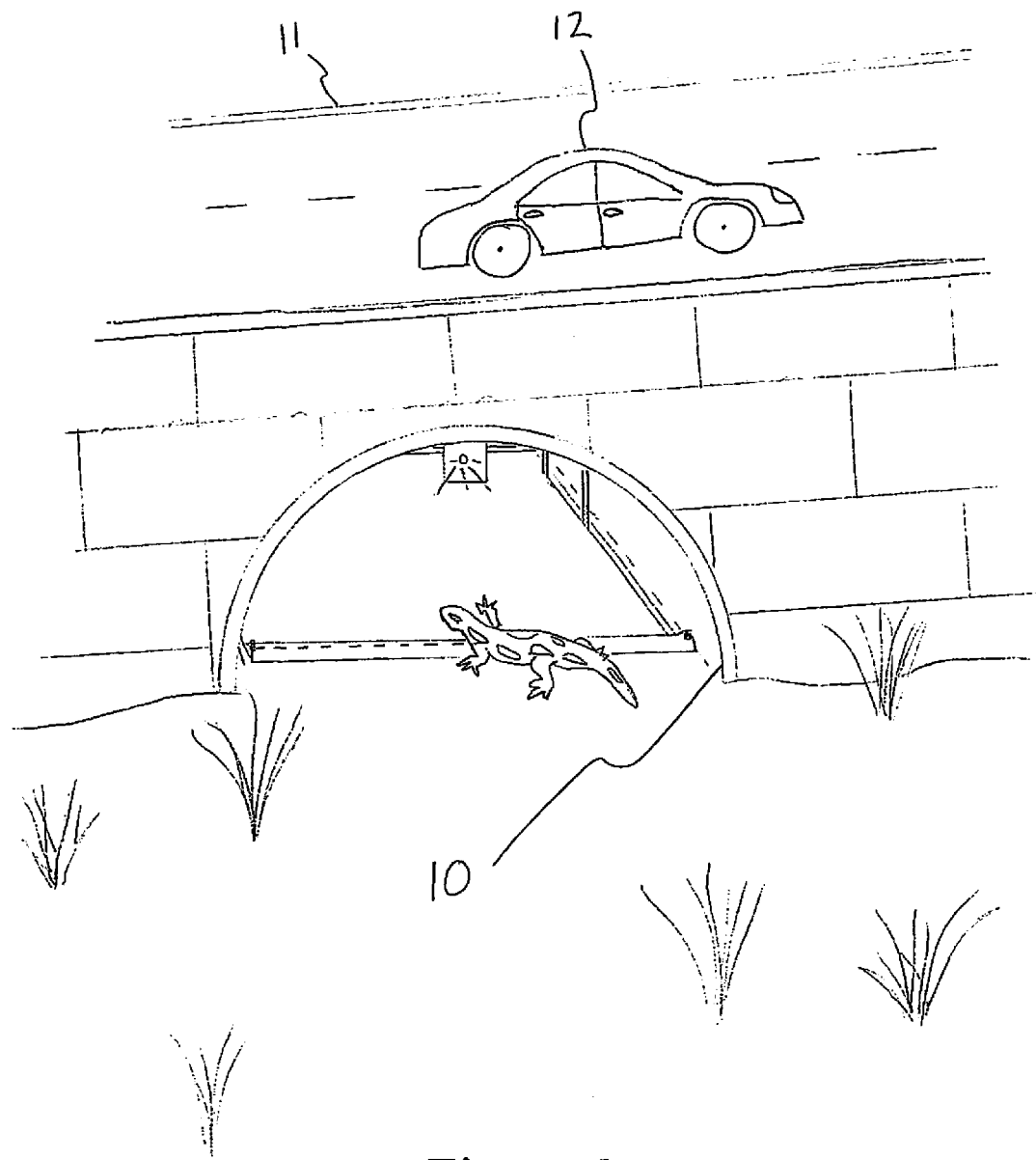
FIG. 6 illustrates a tunnel camera system within a tunnel in accordance with an embodiment.

FIG. 6 illustrates function of tunnel camera system 100 within a tunnel 10. Tunnel 10 is, for example, located under a road 11 on which automobiles 12 pass. Tunnel 10 provides a route for small animals to pass under road 11 without the threat of injury from automobiles 12.

Tunnel camera system 100 can be slid back into tunnel 10, out of view of humans passing by tunnel 10. Elevated threshold 13 extends across the width of tunnel 10 so that any animal 17 passing through tunnel 10 will need to cross elevated threshold 13. As any animal 17 traverses tunnel 10 and crosses threshold 13, animal 17 will temporarily block transmission of light beam 18 from photo emitter 15 to photoelectric receiver 16. As a result, photoelectric receiver 16 will send a trigger signal to controller 32. Controller 32 will signal camera 14 to capture an image or video of animal 17.

Figure 7:
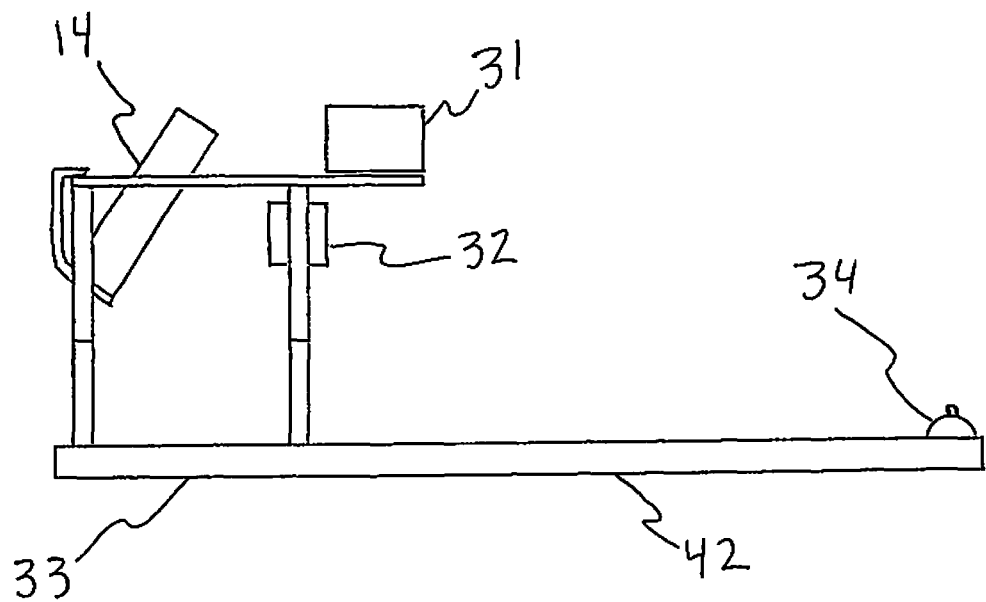
FIG. 7 is a side view of a mounting frame within a tunnel camera system in accordance with an embodiment.
Figure 8:
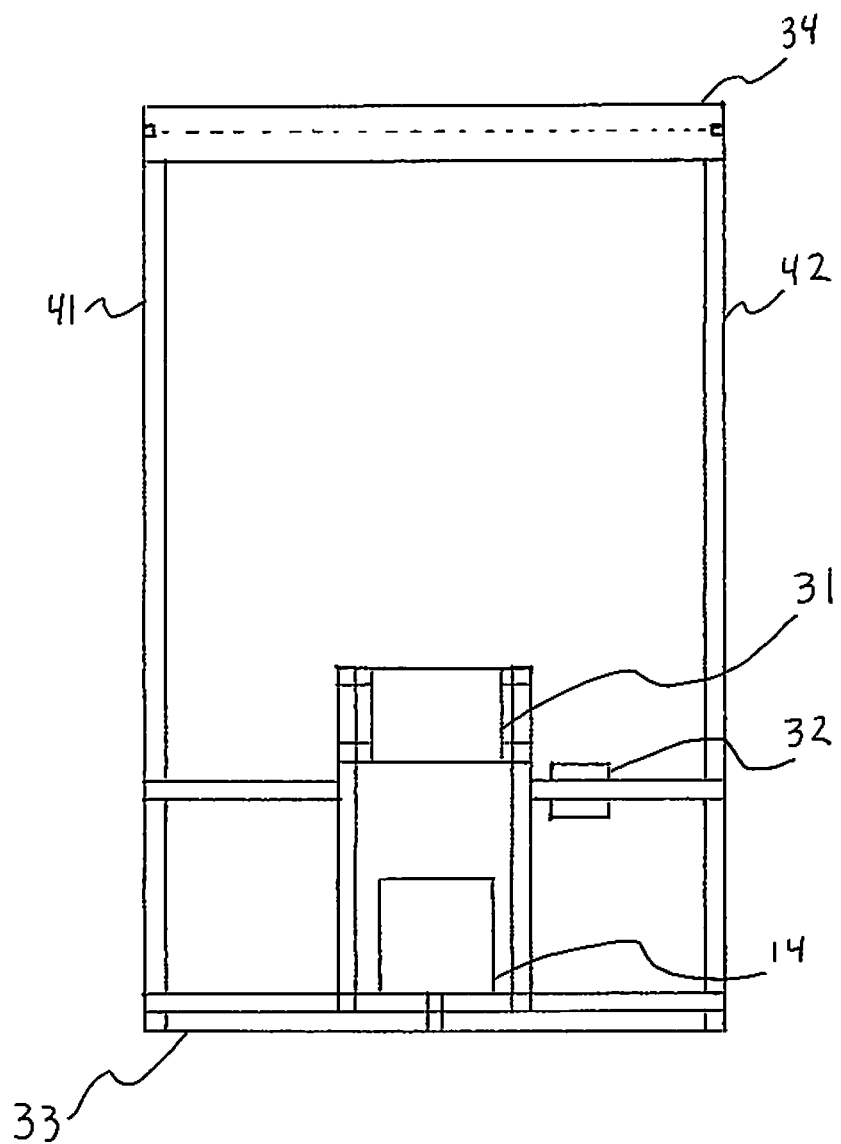
FIG. 8 is a top view of the mounting frame shown in FIG. 7 in accordance with an embodiment.
Figure 9:
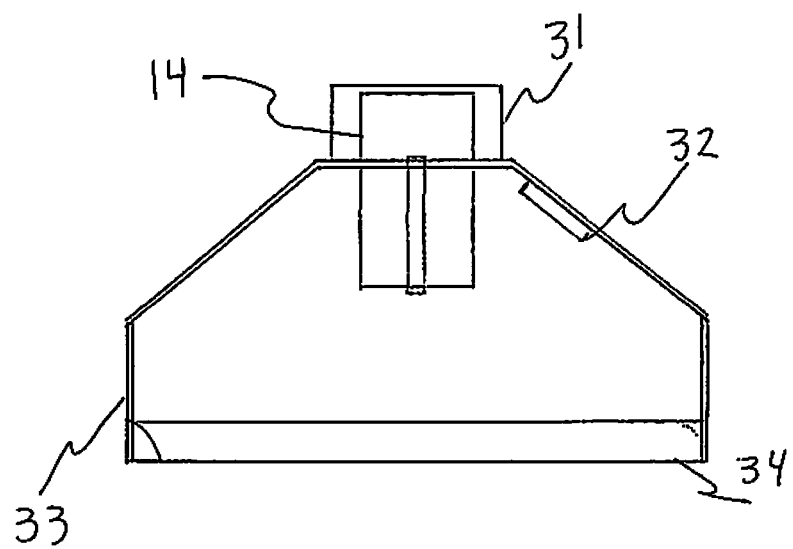
FIG. 9 is a rear view of the mounting frame shown in FIG. 7 in accordance with an embodiment.

FIG. 7 is a side view, FIG. 8 is a top view and FIG. 9 is a rear view of a configuration of mounting frame 33. Mounting frame 33 supports and connects camera 14, controller 32, battery 31 and animal detection unit 34. For example, battery 31 supplies the animal detection unit 34 with +12 volts DC. For example, battery 31 is a sealed non-spillable battery sized to fit with a tunnel configuration. A battery with a four-inch length, three and one half inch width and two and three quarters inch height works well for many tunnel configurations. For example, when battery 31 is a five amperage-hours battery, battery 31 can power animal detection unit 34 for two weeks, depending on frequency of triggers. For example, camera 14 has its own battery and is not powered by battery 31.

Mounting frame 33 is custom made to fit tunnels of different shapes and sizes. For example, a standard mounting frame can be designed to fit an original equipment manufactured tunnel type.

For example, mounting frame 33 shown in FIGS. 7 and 8 is configured to fit and conform to one type of tunnel available from ACO wildlife INT. See http://wvvw.aco-wildlife.com.

Mounting frame 33 needs to conform as close as possible to tunnel walls in tunnel 10. Mounting frame 33 in combination with tunnel 10 should be sized so that animals will not be discouraged from passing through tunnel 10.

Various factors are generally taken into account when configuring mounting frame 33. These include, for example, camera lens focal length and tunnel height and width. The focal length of camera lens 62 is a critical first step in designing mounting frame 33. The focal length must target animal detection unit 34 where animals cross, breaking light beam 18 to trigger capture of a picture and/or video. The focal length must span the full breadth of elevated threshold 13. This ensures pictures and/or videos of animals will be captured and correctly focused as the animals cross elevated threshold 13.

For example, for a typical small tunnel, mounting frame 33 is designed to accommodate a camera lens focal length of 460 millimeters. A typical height for frame 33 is nine inches. A typical width of frame 33 is 18.5 inches, when elevated threshold 13 is equally 18.5 inches across. For example, camera lens 62 is centered and mounted eight and seven eighths inches above the tunnel floor. The camera body of game trail camera 14 is tilted 22 to 24 degrees down, towards elevated threshold 13. Elevated threshold 13 is mounted 23 inches ahead of camera lens 62 by a bar 41 and a bar 42 shown in FIG. 8.

Figure 10:
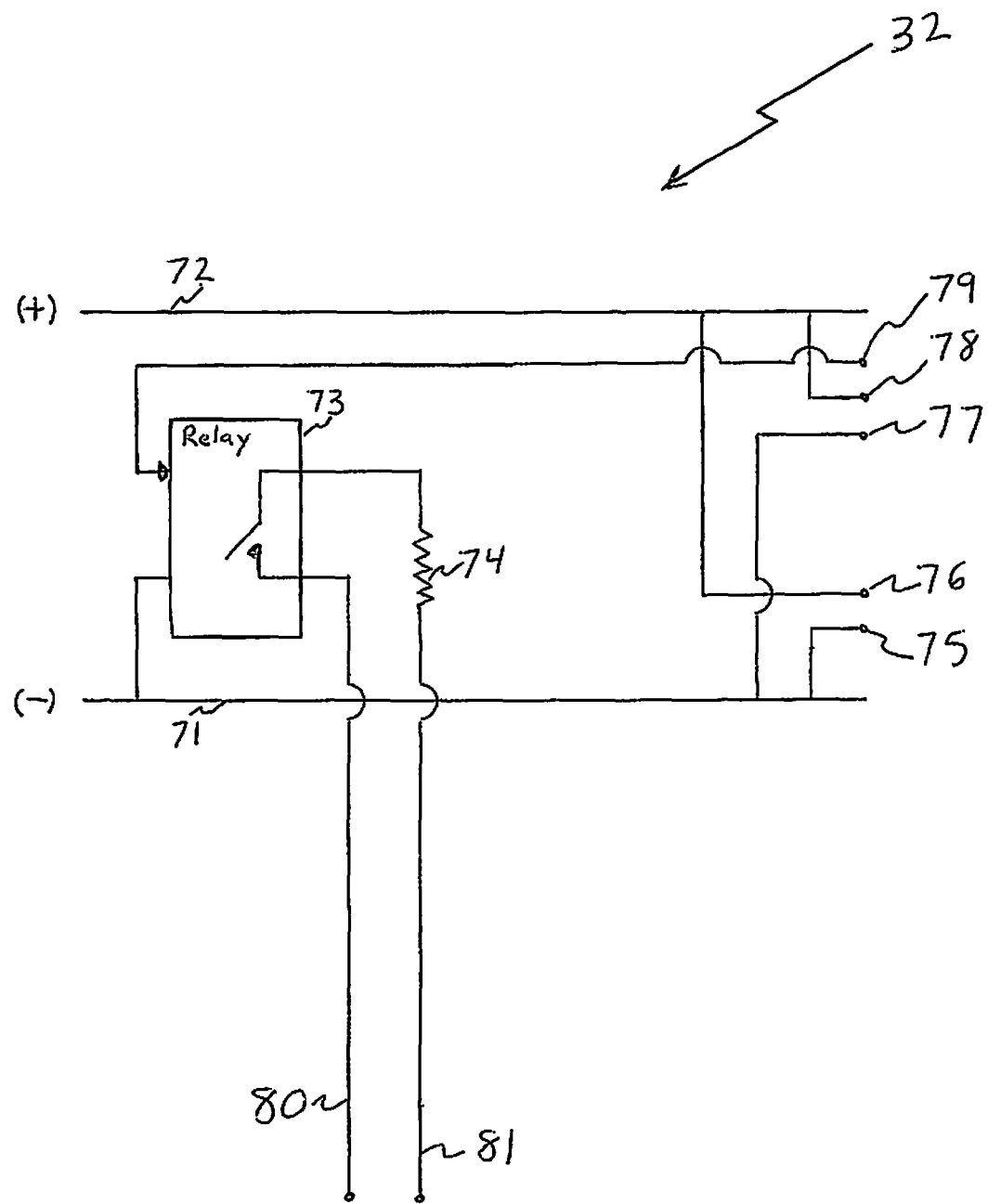
FIG. 10 is a schematic illustrating function of a control circuit of a tunnel camera system in accordance with an embodiment.

FIG. 10 is a schematic illustrating function of control circuit 32. Control circuit 32 includes a ground line 71 and a twelve-volt DC line 72 connected to battery 31. Lines 71 and 72 are connected to and provide power to photo emitter 15 and photoelectric receiver 16. Lines 75 and 76 are connected and provide power to photo emitter 15. Lines 77 and 78 are connected to and provide power to photoelectric receiver 16. Line 79 is connected to photoelectric receiver 16 and generates a trigger signal from photoelectric receiver 16 when light beam 18 is hindered from reaching photoelectric receiver 16. A line 80 and a line 81 are connected to a passive infrared (PIR) motion sensor 63. Line 80 is connected to a drain pin of a pyroelectric field effect transistor (FET) within PIR motion sensor 63. Line 81 is connected to a source pin of the pyroelectric field effect transistor (FET) within PIR motion sensor 63.

When the trigger signal from photoelectric receiver 16 is received by a relay 73, relay 73 completes a circuit from line 80 through a resistor 74 to line 81, signaling to PIR motion sensor 63 detection of an animal travelling across elevated threshold 13. For example, resistor 74 is a ten Megohm resistor. Completion of a circuit from line 80 through a resistor 74 to line 81 causes PIR motion sensor 63 to react exactly as it does when PIR motion sensor 63 detects heat/motion. Connecting line 80 to the source pin of the pyroelectric field effect transistor (FET) within PIR motion sensor 63 and line 81 of the pyroelectric field effect transistor (FET) within PIR motion sensor 63 configures camera 14 to take pictures or videos whenever PIR motion sensor 63 detects heat/motion and when animal detection unit 34 detects traversal of elevated threshold 13.

The resistor configuration can vary provided there is resistance when relay 73 completes the circuit between line 80 and line 81. For example, while in FIG. 10 resistor 74 is connected to line 81, instead resistor 74 can be connected to line 80. Alternatively, a resistor can be attached to either line 81 or line 82. The resistor configuration can vary provided there is resistance when relay 73 completes the circuit between line 80 and line 81.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A tunnel camera system comprising
a frame sized to fit within a tunnel;
an animal detection unit that detects cold-blooded animals traversing the tunnel, the animal detection unit including:
   an elevated threshold that extends across a width of the tunnel, the elevated threshold including:
      a photo emitter that generates a light beam, the photo emitter being mounted at a first end of the elevated threshold, and
      a photoelectric receiver that receives the light beam, the photoelectric receiver mounted at a second end of the elevated threshold, wherein the light beam is low enough with respect to a surface of the elevated threshold that cold-blooded animals moving over the surface of the elevated threshold are raised in height sufficiently to block the light beam as the cold-blooded animals move over the elevated threshold; and,
a camera, mounted on the frame, the camera being aimed toward the surface of the elevated threshold and focused to capture visual recordings of the cold-blooded animals as they move over the elevated threshold;
wherein the photoelectric receiver sends a trigger signal when an animal blocks the light beam, the camera capturing a first visual recording of the animal when the photoelectric receiver sends the trigger signal;
wherein a top surface of the elevated threshold is solid and forms a ridge that is sloped downward from a peak height through-out the top surface at a sufficient angle that encourages debris to roll off the elevated threshold.

2. A tunnel camera system as in claim 1, wherein each visual recording is at least one of the following:
   a picture;
   a video.

3. A tunnel camera system as in claim 1, wherein the camera includes a passive infrared (PIR) motion sensor, the PIR motion sensor detecting when medium sized warm-blooded animals traverse the tunnel, the camera capturing visual recordings of the medium sized warm-blooded animals when the PIR motion sensor detects the medium sized warm-blooded animals traversing the tunnel.

4. A tunnel camera system as in claim 3, additionally comprising:
   a controller, the controller receiving the trigger signal from the photoelectric receiver, the controller generating a capture signal on the PIR motion sensor when the controller receives the trigger signal from the photoelectric receiver, so that the photoelectric receiver triggers the capture signal on the PIR motion sensor even when the PIR motion sensor does not detect warmth from a warm-blooded animal.

5. A tunnel camera system as in claim 4, wherein the controller includes a relay, connected to a drain pin of a pyroelectric field effect transistor (FET) within the PIR motion sensor and connected through a resistor to a source pin of the pyroelectric FET, the relay completing a circuit from the drain pin through the resistor to the source pin when the controller receives the trigger signal from the photoelectric receiver.

6. An animal detection unit that detects cold-blooded animals traversing a constricted area, the animal detection unit including:
   an elevated threshold that extends across a width of the constricted area, the elevated threshold including:
      a photo emitter that generates a light beam, the photo emitter being located at a first end of the elevated threshold, and
      a photoelectric receiver that receives the light beam, the photoelectric receiver located at a second end of the elevated threshold, wherein the light beam is low enough with respect to the elevated threshold that cold-blooded animals moving over a surface of the elevated threshold are raised in height sufficiently to block the light beam as the cold-blooded animals move over the surface of the elevated threshold, wherein the photoelectric receiver sends a trigger signal whenever any cold-blooded animal blocks the light beam, the trigger signal used to trigger a camera aimed toward the surface of the elevated threshold to capture a visual recording;
   wherein a top surface of the elevated threshold is solid and forms a ridge that is sloped downward from a peak height through-out the top surface at a sufficient angle that encourages debris to roll off the elevated threshold.

7. An animal detection unit as in claim 6, wherein the visual recording is at least one of the following:
   a picture;
   a video.

8. An animal detection unit as in claim 6, wherein the camera includes a passive infrared (PIR) motion sensor, the PIR motion sensor detect motion of medium sized warm-blooded animals, the camera capturing visual recordings of the medium sized warm-blooded animals when the PIR motion sensor detects the motion of the medium sized warm-blooded animals.

9. An animal detection unit as in claim 8, wherein a controller receives the trigger signal from the photoelectric receiver, the controller generating a capture signal on the PIR motion sensor when the controller receives the trigger signal from the photoelectric receiver, so that the photoelectric receiver triggers the capture signal on the PIR motion sensor even when the PIR motion sensor does not detect warmth from a warm-blooded animal.

10. An animal detection unit as in claim 9, wherein the controller includes a relay connected to a drain pin of a pyroelectric field effect transistor (FET) within the PIR motion sensor and connected through a resistor to a source pin of the pyroelectric FET, the relay completing a circuit from the drain pin through the resistor to the source pin when the controller receives the trigger signal from the photoelectric receiver.

11. A method for detecting cold-blooded animals traversing a constricted area, the method comprising:
   placing an elevated threshold across a width of the constricted region;
   generating a light beam from a first end of the elevated threshold that travels across the width of the constricted region over the elevated threshold, the light beam being low enough with respect to the elevated threshold that cold-blooded animals moving over the elevated threshold are raised in height sufficiently to block the light beam as the cold-blooded animals move over the elevated threshold;

detecting when the light beam is blocked;

generating a trigger signal upon detecting the light beam is blocked; and, capturing a visual recording when the trigger signal is generating, the visual recording capturing any cold-blooded animal moving over the elevated threshold;

wherein a top surface of the elevated threshold is solid and forms a ridge that is sloped downward from a peak height through-out the top surface at a sufficient angle that encourages debris to roll off the elevated threshold;

using a passive infrared (PIR) motion sensor to detect when medium sized warm-blooded animals traverse the constricted region; and, capturing visual recordings of the medium sized warm-blooded animals when the PIR motion sensor detects the medium sized warm-blooded animals traverses the constricted region, a controller to receive the trigger signal; and, generating, by the controller, a capture signal on the PIR motion sensor when the controller receives the trigger signal, so that the capture signal on the PIR motion sensor is triggered even when the PIR motion sensor does not detect warmth from a warm-blooded animal.

12. A method as in claim 11, wherein the visual recording is at least one of the following:
  a picture;
  a video.

13. A method as in claim 11, wherein generating the capture signal includes:
  using a relay within the controller to complete a circuit from a drain pin of a pyroelectric field effect transistor (FET) within the PIR motion sensor, through a resistor, to a source pin of the pyroelectric FET when the controller receives the trigger signal.

14. An animal detection unit that detects cold-blooded animals traversing a constricted area, the animal detection unit comprising:
  an elevated threshold that extends across a width of the constricted area, the elevated threshold including:
    a photo emitter that generates a light beam, the photo emitter being located at a first end of the elevated threshold, and
    a photoelectric receiver that receives the light beam, the photoelectric receiver located at a second end of the elevated threshold, wherein the light beam is low enough with respect to the elevated threshold that cold-blooded animals moving over a surface of the elevated threshold are raised in height sufficiently to block the light beam as the cold-blooded animals move over the surface of the elevated threshold, wherein the photoelectric receiver sends a trigger signal whenever any cold-blooded animal blocks the light beam, the trigger signal used to trigger a camera;
  a camera system aimed toward the surface of the elevated threshold to capture a visual recording, the camera system comprising:
    a passive infrared (PIR) motion sensor, the PIR motion sensor including,
      pyroelectric field effect transistor (FET) having a source pin and a drain pin; and,
    a relay and a resistor connected in series with the source pin and the drain pin so that the relay, in response to the trigger signal, completes a circuit from the drain pin of the pyroelectric FET through the resistor to the source pin of the pyroelectric FET to generate a capture signal on the PIR motion sensor, and so that the photoelectric receiver triggers a capture signal on the PIR motion sensor even when the PIR motion sensor does not detect warmth from a warm-blooded animal.

15. An animal detection unit as in claim 14 wherein the resistor is connected between the source pin and the relay.

16. An animal detection unit as in claim 14 wherein the resistor is connected between the drain pin and the relay.

17. A tunnel camera system as in claim 1 wherein the elevated threshold is shaped so that debris tends to fall off of the elevated threshold.

18. An animal detection unit as in claim 6 wherein the elevated threshold is shaped so that debris tends to fall off of the elevated threshold.

* * * * *